(12) United States Patent
Uchiyama

(10) Patent No.: US 6,274,959 B1
(45) Date of Patent: Aug. 14, 2001

(54) MAGNETIC FORCE DRIVING APPARATUS WITH ROTARY MEMBER AND RECIPROCATING MEMBER

(76) Inventor: Fumio Uchiyama, 1-1387, Yokoya, Sunami-cho, Motosu-gun, Gifu-ken 501-03 (JP)

( * ) Notice: Subject to any disclaimer, the term of this patent is extended or adjusted under 35 U.S.C. 154(b) by 0 days.

(21) Appl. No.: 08/818,947

(22) Filed: Mar. 17, 1997

(51) Int. Cl.⁷ .......................... H02K 11/00; H02K 53/00; H02K 49/00
(52) U.S. Cl. .......................... 310/152; 310/75 R; 310/20
(58) Field of Search .................. 310/12, 15, 20, 310/80, 103, 156, 154, 152, 74

(56) References Cited

U.S. PATENT DOCUMENTS

| | | | | |
|---|---|---|---|---|
| 3,967,146 | * | 6/1976 | Howard | 310/80 |
| 4,167,684 | * | 9/1979 | Kelly | 310/80 |
| 4,179,633 | | 12/1979 | Kelly | 310/80 |
| 4,207,773 | * | 6/1980 | Stahovic | 74/25 |
| 5,903,069 | * | 5/1999 | Hiterer | 310/15 |

FOREIGN PATENT DOCUMENTS

| | | |
|---|---|---|
| 61380/80 | 8/1980 | (AU) . |
| 2196340 | 1/1997 | (CA) . |
| 0 130 048 | 1/1985 | (EP) . |
| 0 152 252 | 8/1985 | (EP) . |
| 2617654 | 3/1987 | (FR) . |
| 2 140 216 | 11/1984 | (GB) . |
| 2222915 | 3/1990 | (GB) . |
| 54-48019 | 4/1979 | (JP) . |
| 56-080555 | 7/1981 | (JP) . |
| 58-006470 | 1/1983 | (JP) . |
| 60-219960 | 11/1985 | (JP) . |
| 63-287358 | 11/1988 | (JP) . |
| 02013285 | 1/1990 | (JP) . |
| 6-26442 | 2/1994 | (JP) . |
| WO 92/22958 | 12/1992 | (WO) . |

OTHER PUBLICATIONS

Examination Report issued by Australian Patent Office on Jun. 23, 1997 regarding counterpart Australian application S.N. 16325/97.
European Search Report, Aug. 5, 1997.

* cited by examiner

Primary Examiner—Tran Nguyen
(74) Attorney, Agent, or Firm—TraskBritt, PC

(57) ABSTRACT

A driving apparatus includes a rotatable disk. The rotatable disk has a first magnet alley including a plurality of first permanent magnets arranged along a periphery of the disk. A reciprocal device has a second magnet alley that includes a plurality of second permanent magnets in association with the first permanent magnets. Each second permanent magnet is movable between two positions to attract and repel each first permanent magnet.

9 Claims, 8 Drawing Sheets

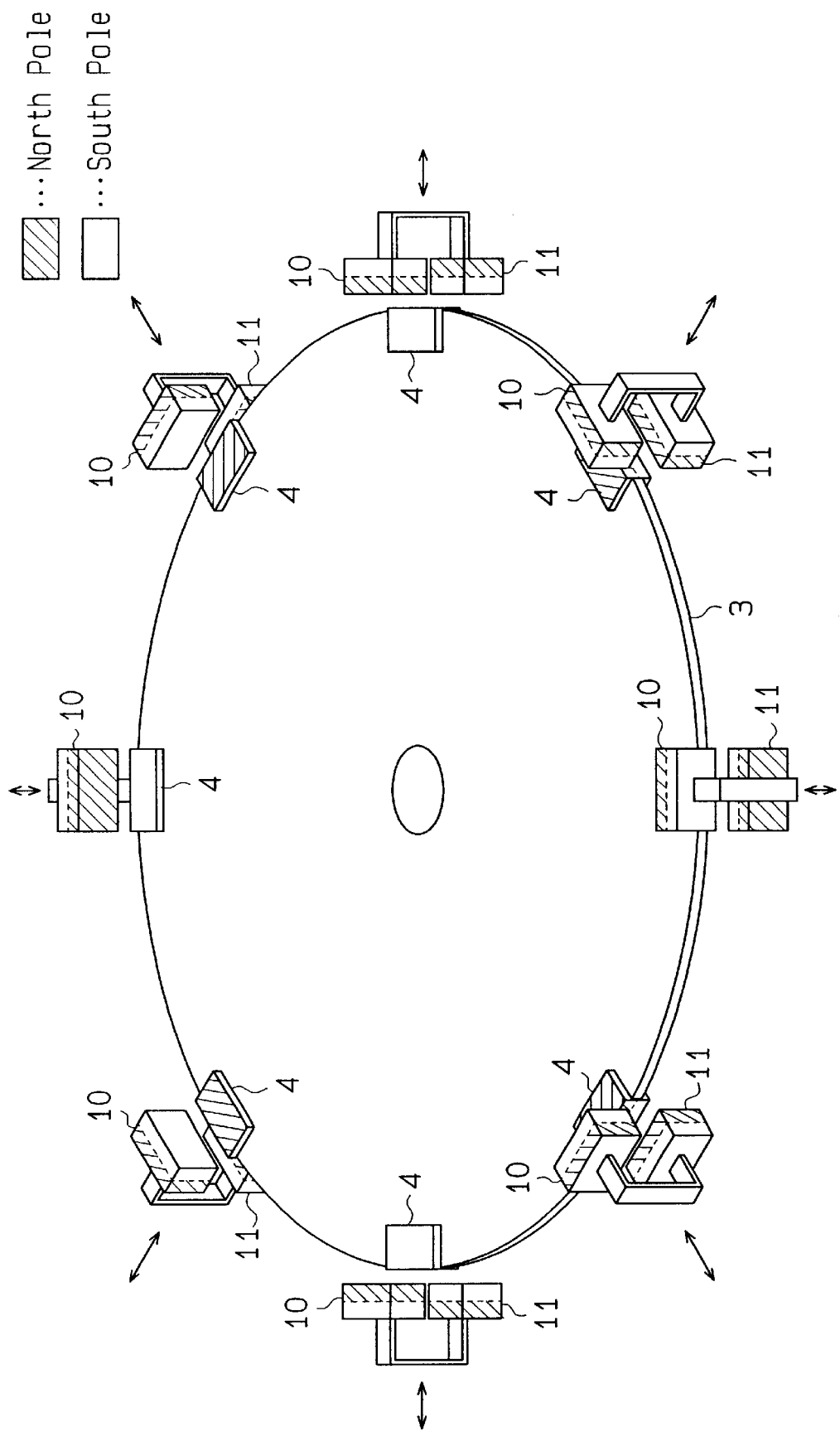

MAGNETIC FORCE DRIVING APPARATUS WITH ROTARY MEMBER AND RECIPROCATING MEMBER

BACKGROUND OF THE INVENTION

1. Field of the Invention

The present invention relates to a driving apparatus utilizing permanent magnets.

2. Description of the Related Art

Reciprocating engines mounted on cars and the like are known as one kind of driving apparatus. The reciprocating engine generally comprises a plurality of cylinders having a combustion chamber in which a reciprocating piston is provided. The piston is operatively connected to a crankshaft via a connecting rod. The crankshaft is in turn operatively connected to a drive shaft via a transmission or other transmitting mechanism so as to transmit a driving force to tires of the car. A mixture of gasoline and air is burned in the combustion chamber after injection of the gasoline and air into the combustion chamber so that force generated thereby reciprocates the piston so as to rotate the crankshaft. Torque of the crankshaft is in turn transmitted to the drive shaft.

However, known reciprocating engines combust gasoline so that noxious gas containing soot, nitrogen oxide and other components is released into the atmosphere. Environmental deterioration due to the noxious exhaust gas has been a serious problem.

SUMMARY OF THE INVENTION

It is therefore a primary object of the present invention to provide driving force without deteriorating the environment by utilizing attraction and repulsion of permanent magnets.

In a first aspect of the present invention, a driven member having a first permanent magnet and a movable member having a second permanent magnet are arranged in such a manner that the movable member reciprocates between attracting position in which both first and second permanent magnets are attracted to each other and a repelling position in which both first and second permanent magnets are repelled from each other. The driven member is driven by moving the movable member between the two positions. The driving force of the driven member created thereby is used as a source of mechanical power. In this arrangement, as the movable member reciprocates between the attracting and repelling positions, the first permanent magnet is attracted to or repelled from the second permanent magnet. The attractive and repulsive forces of these magnets are used to drive the driven member.

In a second aspect of the present invention, a gap between one side of the first permanent magnet of the driven member and the same side of the second permanent magnet of the movable member differs from a gap between the other side of the first permanent magnet and the same side of the second permanent magnet. With this arrangement, attractive and repulsive forces formed between the first and second permanent magnets differ between the two sides of each magnet. This causes the driven member to be driven in a reliable manner.

In a third aspect of the present invention, at least two sets of first and second permanent magnets are provided in such a manner that a permanent magnet having one polarity and another permanent magnet having the opposite polarity are alternately placed next to each other. With this arrangement, the entire attractive and repulsive forces for driving the driven member are increased with use of a plurality of sets of the permanent magnets.

In a fourth aspect of the present invention, the movable member is driven by a fluidic pressure of a fluidic cylinder.

BRIEF DESCRIPTION OF THE DRAWINGS

FIG. 9 is a perspective view showing the arrangement of the permanent magnets;

DETAILED DESCRIPTION OF THE PREFERRED EMBODIMENTS

Figure 1:
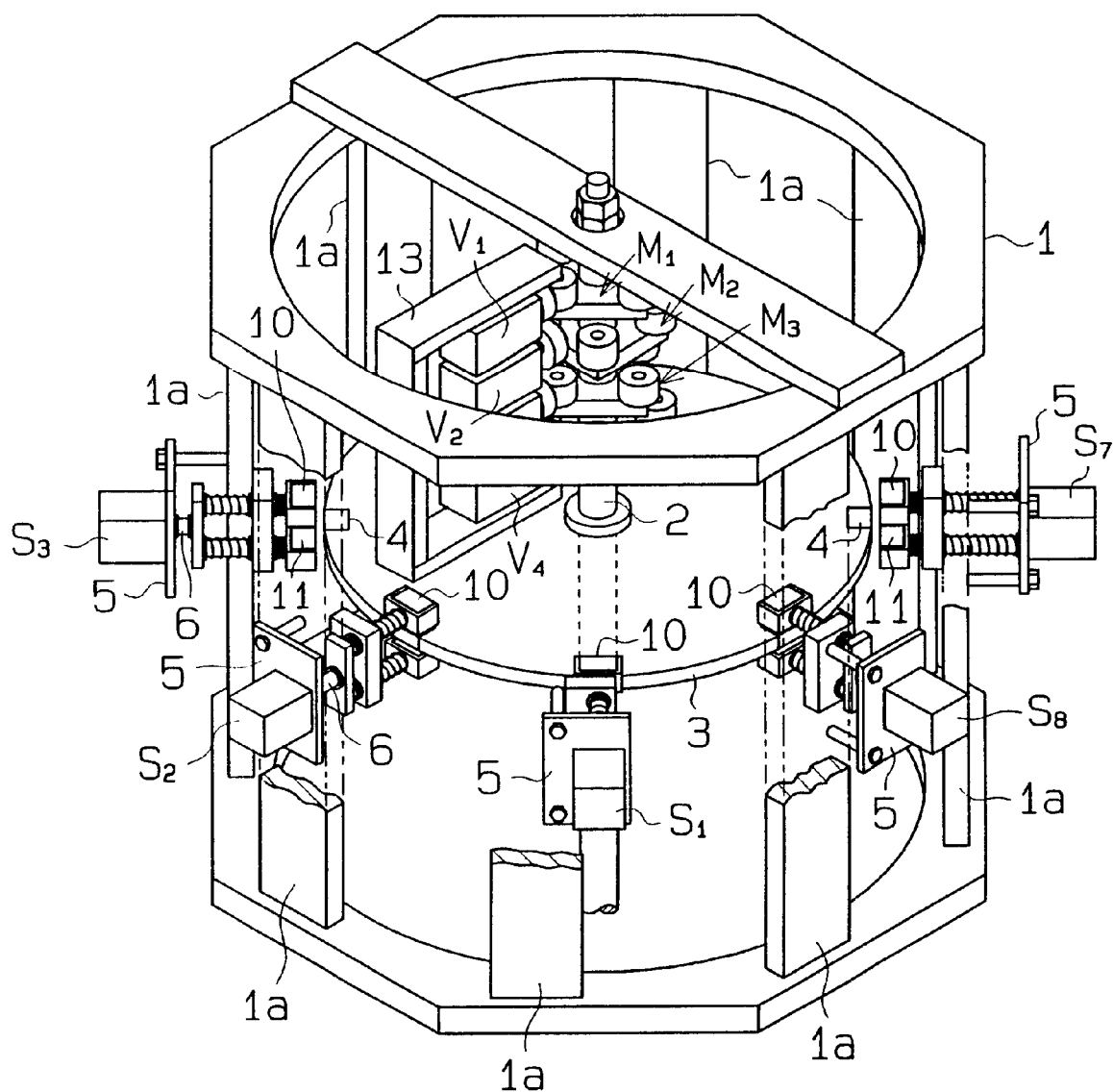
FIG. 1 is a perspective view of a driving apparatus according to an embodiment of the present invention.
Figure 2:
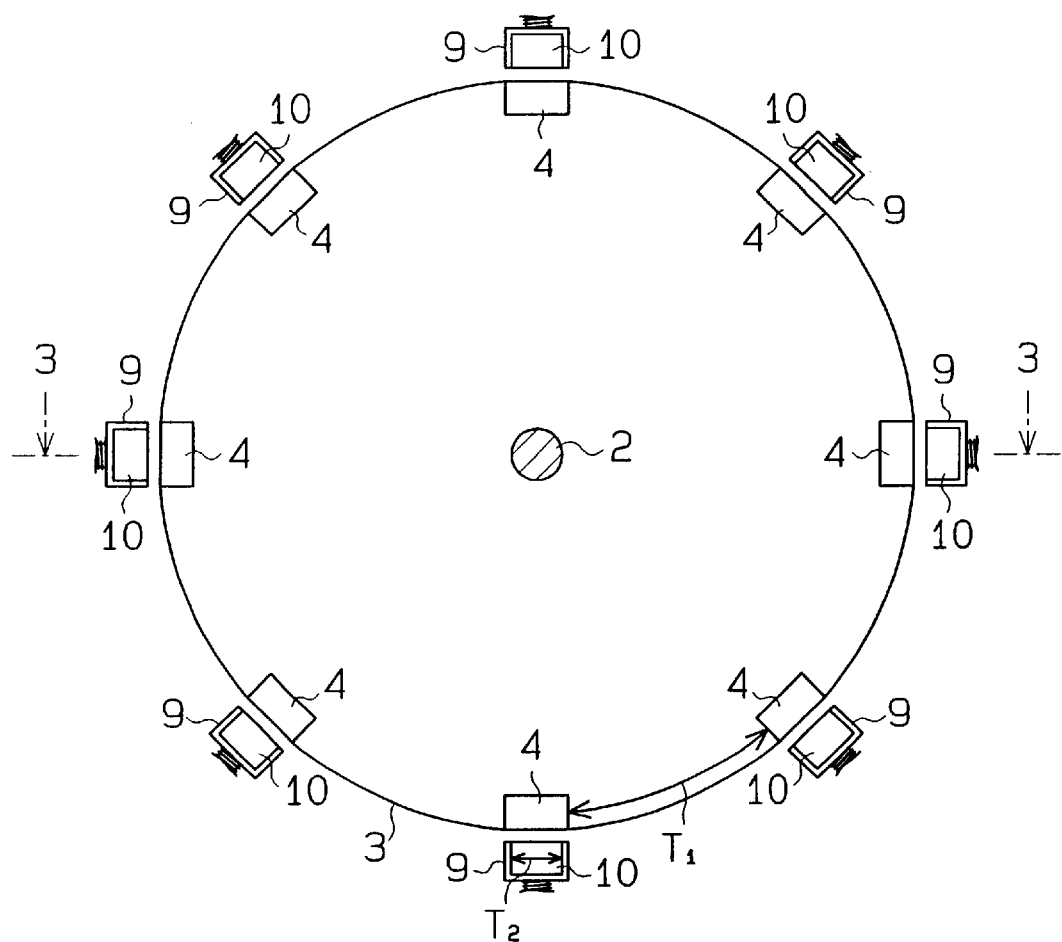
FIG. 2 is a plan view of a rotating disk of the driving apparatus of FIG. 1.
Figure 3:
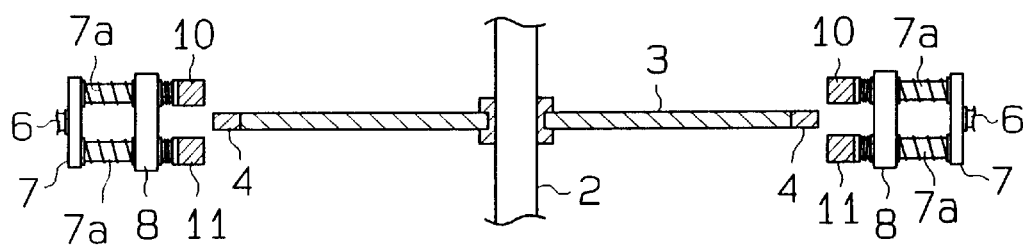
FIG. 3 is a cross sectional view taken along the line 3—3 of FIG. 2.

As shown in FIGS. 1 to 3, a vertical drive shaft 2 is rotatably supported on a frame 1. A rotating disk 3, serving as a driven member, formed of aluminum (non-magnetic material), is fixed around a middle portion of the drive shaft 2 so as to rotate with the drive shaft 2. A plurality of stationary permanent magnets 4 (eight are used in this embodiment) are fixed around the circumference of the rotating disk 3 at regular intervals. Each magnet 4 has a cross section that forms a parallelogram, and the top and bottom surfaces thereof are slightly inclined relative to the planar top and bottom surfaces of the rotating disk 3.

As shown in FIG. 9, the top surface of each stationary permanent magnet 4 has a polarity that is opposite to that of the bottom surface. The stationary permanent magnets 4 are alternately arranged along the circumference of the rotating disk 3 in such a manner that the polarity of one stationary magnet 4 is opposite to that of the next stationary magnet 4. In other words, stationary magnets 4 having a top surface magnetized with south polarity and a bottom surface magnetized with north polarity and stationary magnets 4 having a top surface magnetized with north polarity and a bottom surface magnetized with south polarity are alternately arranged.

Figure 4A:
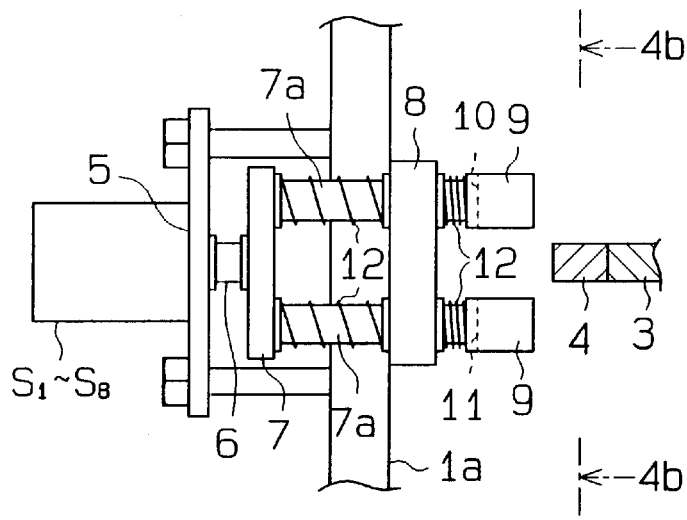
FIG. 4(a) is a side view showing an arrangement of moving permanent magnets.
Figure 5:
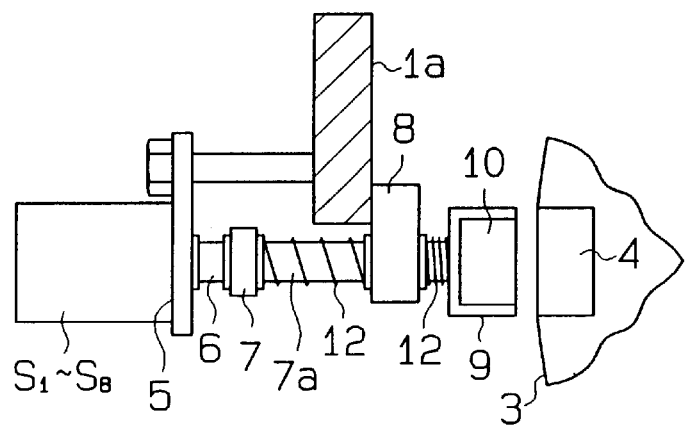
FIG. 5 is a plan view showing an arrangement of the moving permanent magnets.

As shown in FIGS. 1, 4(a) and 5, first to eighth air cylinders S1–S8 or fluidic cylinders, each having a rod 6 oriented radially toward the drive shaft 2, are mounted on a supporting pillar 1a of the frame 1 via a mounting plate 5 at equal intervals. The first, third, fifth and seventh air cylinders S1,S3,S5,S7 are hereinafter collectively referred as the odd-numbered air cylinders. Also, the second, fourth, sixth and eighth air cylinders S2,S4,S6,S8 are hereinafter collectively referred as the even-numbered air cylinders. A distal end of each rod 6 is attached to a connecting plate 7 from which moving shafts 7a, which are located on upper and lower sides of the connecting plate 7, are extended. Each moving shaft 7a is slidably supported through a bearing member 8 fixed on an inner surface of the supporting pillar 1a. A distal end of each moving shaft 7a is fixed to a bracket 9 on which a corresponding upper or lower moving permanent magnet 10,11 is mounted. Compression springs 12 are placed on the moving shafts 7a between the connecting plate 7 and the bearing member 8 and also between the bearing member 8 and the bracket 9. By extending or retracting the rod 6 of each air cylinder S1–S8 in a radial direction of the rotating disk 3, the upper and lower moving permanent magnets 10,11 are moved forward or backward relative to the top and bottom surfaces of the stationary permanent magnet 4 respectively.

Figure 4B:
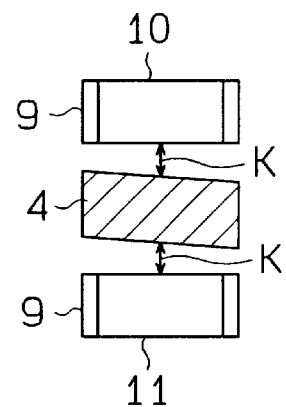
FIG. 4(b) is a cross sectional view taken along the line 4b—4b of FIG. 4(a)

Also as shown in FIG. 4(b), the bottom surface of the upper moving permanent magnet 10 and the top surface of the stationary permanent magnet 4 are not parallel to one another. Also, the top surface of the lower moving permanent magnet 11 and the top surface of the stationary permanent magnet 4 are not parallel to each other. That is, a gap K between the stationary permanent magnet 4 and the upper or lower moving permanent magnet 10,11 differs between the right and left sides (in FIG. 4(b)) (i.e., the leading and trailing sides) of the stationary permanent magnet 4. Therefore, since the gaps K are not equal, the magnetic forces created between the stationary permanent magnet 4 and the moving permanent magnets 10,11 are unbalanced, and the rotating disk 3 begins to rotate due to a repulsive force.

As shown in FIG. 9, the distal and proximal ends of the upper moving permanent magnets 10, which are connected to the even-numbered air cylinders S2,S4,S6,S8, have south and north polarities, respectively, and the distal and proximal ends of the lower moving permanent magnet 11 have north and south polarities, respectively. The distal and proximal ends of the upper moving permanent magnets 10, which are connected to the odd-numbered air cylinders S1,S3,S5,S7, have north and south polarities, respectively, and the distal and proximal ends of the lower moving permanent magnet 11 have south and north polarities, respectively. That is, the distal and proximal ends of each upper and lower moving permanent magnet 10,11 associated with the even-numbered air cylinders S2,S4,S6,S8 have polarities that are opposite to that of the corresponding ends of the upper and lower moving permanent magnets 10,11 in the odd-numbered air cylinders S1,S3,S5,S7.

Figure 6:
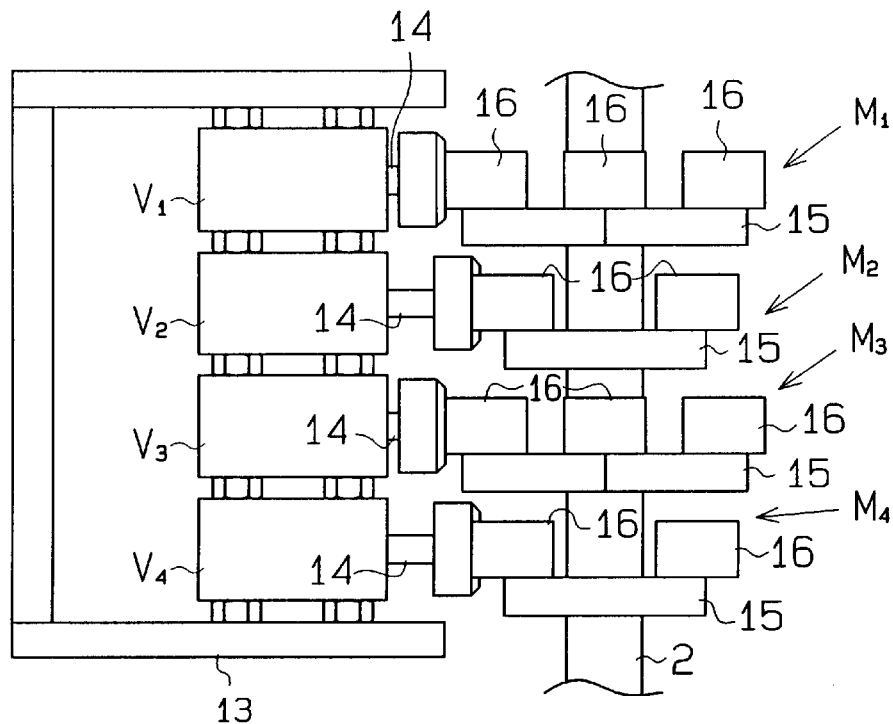
FIG. 6 is a side view showing the first to fourth switching valve driving mechanisms.

As shown in FIGS. 1 and 6, first to fourth switching valves V1–V4 are fixed to the frame 1 via a mount 13 near an upper end of the drive shaft 2. Each switching valve V1–V4 is provided with an actuating rod 14 that can extend or retract. First to fourth valve driving mechanisms M1–M4 correspondingly face switching valves V1–V4, which are provided on the drive shaft 2 near its upper end. A rotating plate 15 having a square plan view is provided for each valve driving mechanism M1–M4. The plates are fixed to the shaft for integral rotation therewith. A roller 16 is mounted on each corner of the rotating plate 15 at equal distances from the center. The rollers 16 abut against the distal end of the actuating rod 14 of each switching valve V1–V4.

Figure 7A:
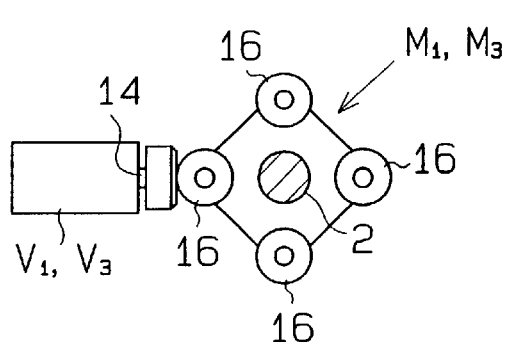
FIG. 7(a) is a plan view of a switching valve driving mechanism.
Figure 7B:
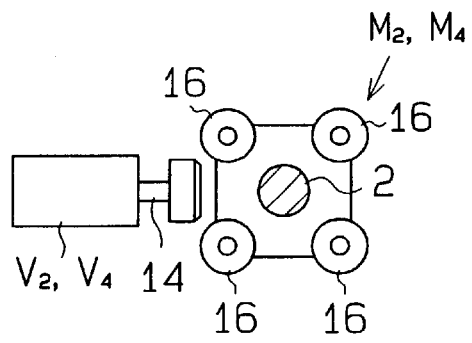
FIG. 7(b) is another plan view of a switching valve driving mechanism.

Also, as shown in FIGS. 7(a) and 7(b), rotating plates 15 of the first and third valve driving mechanisms M1,M3 are fixed at positions that are rotated 45 degrees from the positions of rotating plates 15 of the second and fourth valve driving mechanisms M2, M4. As the drive shaft 2 rotates, the rotating plates 15 of the first and third valve driving mechanisms M1, M3 and the rotating plates 15 of the second and fourth valve driving mechanisms M2, M4 rotate while keeping this relationship.

Figure 8:
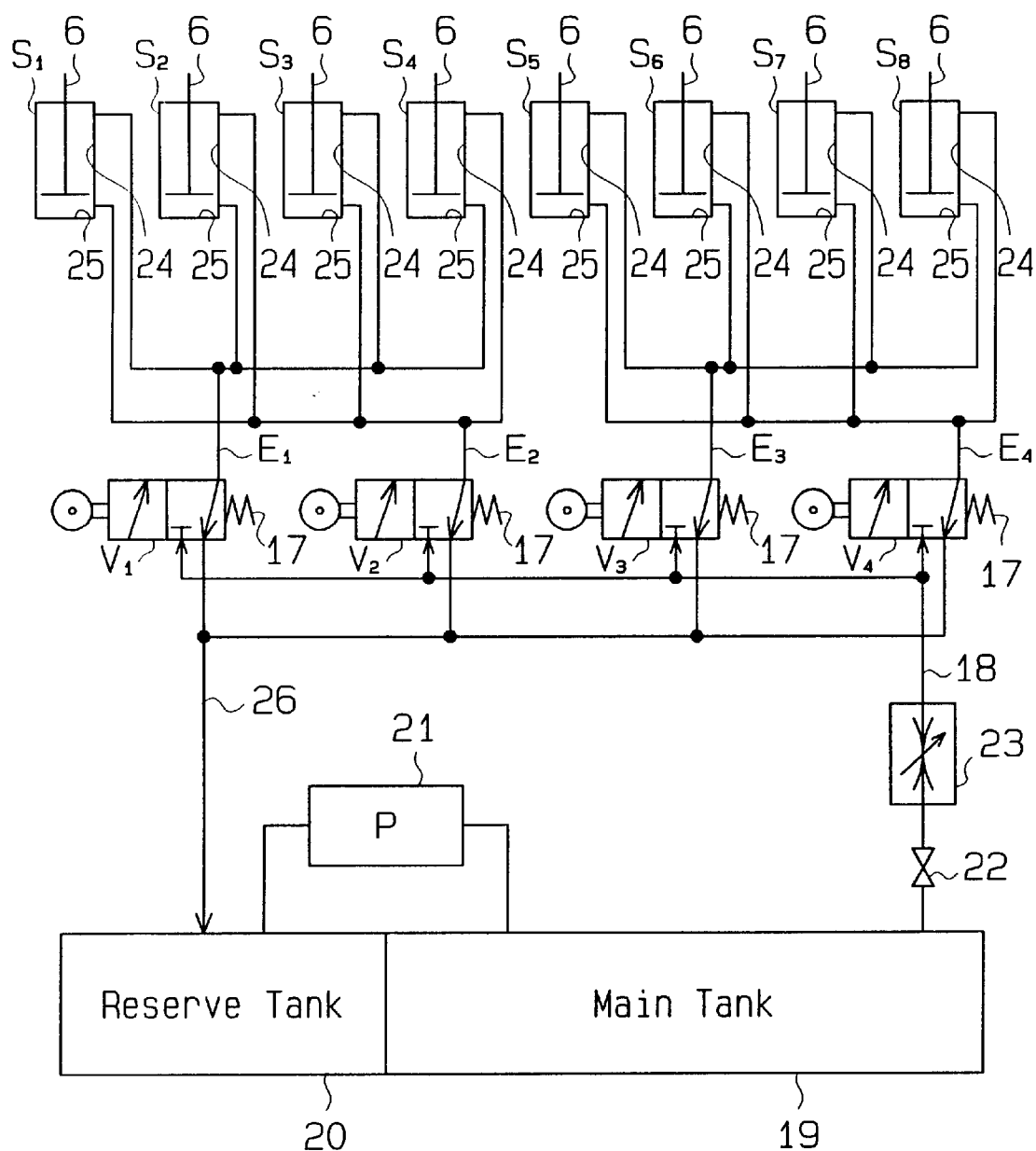
FIG. 8 is a schematic diagram showing a pneumatic circuit within the driving apparatus.

As shown in FIG. 8, each of the first to fourth switching valves V1–V4 has five ports and can be switched between two positions, i.e., intake and discharge positions (in FIG. 8, all valves V1–V4 are positioned in the discharge position). Each switching valve V1–V4 is provided with a spring 17 that presses the switching valve V1–V4 into the discharge position. The spring force of the spring 17 presses the actuating rod 14 toward its extended position. The first and third switching valves V1, V3 normally take a position that is opposite to that of the second and fourth switching valves V2, V4. The first to fourth switching valves V1–V4 are respectively communicated with a main tank 19 containing compressed air via an air supply line 18.

The main tank 19 communicates with a reserve tank 20 that supplies air into the main tank 19 if the internal pressure of the main tank 19 drops. The reserve tank 20 communicates with a discharge line 26 connected with the first to fourth switching valves V1–V4. Both the main tank 19 and the reserve tank 20 are connected with a manual air pump 21. A valve 22 for closing and opening the air supply line 18 and a pressure-reducing valve 23 for adjusting the pressure of air supplied from the main tank 19 are placed in the air supply line 18. The switching speed of the first to fourth switching valves V1–V4 can be increased by adjusting the pressure-reducing valve 23 so as to increase the air pressure supplied to the switching valves V1–V4. In so doing, the rotational speed of the rotating disk 3 can be increased.

The first to fourth switching valves V1–V4 communicate with each air cylinder S1–S8 via the first to fourth air lines E1–E4. The first and third air lines E1,E3 communicate with first cylinder chambers 24 (located at the piston rod side of the odd-numbered air cylinders S1,S3,S5,S7) and second cylinder chambers 25 (located at the piston head side of the even-numbered air cylinders S2,S4,S6,S8). The second and fourth air lines E2,E4 communicate with the second cylinder chambers 25 of the odd-numbered air cylinders S1,S3,S5,S7 and also the first cylinder chambers 24 of the even-numbered air cylinders S2,S4,S6,S8.

In the odd-numbered air cylinders S1,S3,S5,S7, the rods 6 are extended, by supplying air into the second cylinder chambers 25 via the second and fourth air lines E2,E4, and, at the same time, discharging air from the first cylinder chambers 24 via the first and third air lines E1,E3. in the even-numbered air cylinders S2,S4,S6,S8, the rods 6 are extended by supplying air into the second cylinder chamber 25 via the first and third air lines E1,E3, and, at the same time, discharging air from the first cylinder chambers 24 via the second and fourth air lines E2,E4.

Operation of the driving apparatus configured as above are hereinafter described.

First, operation of the even-numbered air cylinders S2,S4, S6,S8 is described.

Figure 10A:
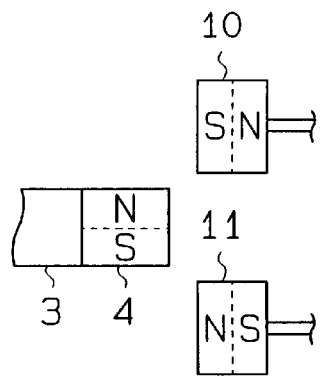
FIG. 10(a) is a schematic side view showing attraction between the stationary permanent magnet and the moving permanent magnets.
Figure 10B:
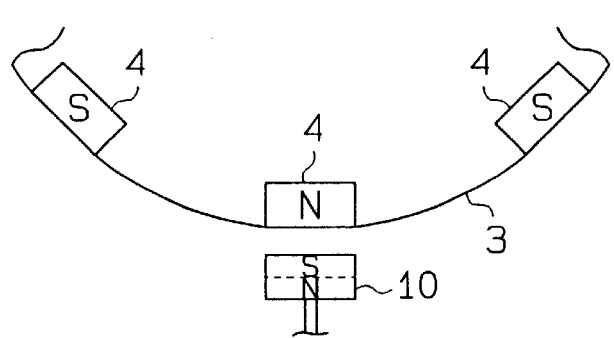
FIG. 10(b) is a schematic view of FIG. 10(a)

Prior to operation, the actuating rods 14 of the first and third switching valves V1,V3 are engaged with the rollers 16 of the first and third valve driving mechanisms M1,M3 (see FIG. 7(a)), and the actuating rods 14 of the second and fourth switching valves V2,V4 are not engaged with the rollers 16 of the second and fourth valve driving mechanisms M2,M4 (see FIG. 7(b)). In this state, the rods 6 of the even-numbered air cylinders S2,S4,S6,S8 are in the retracted position as shown in FIGS. 10(a) and 10(b). The stationary permanent magnet 4 and the upper and lower moving permanent magnets 10,11 are attracted each other by magnetic forces. That is, sides of the magnets 4,10,11 having opposite polarities are in close proximity to one another, which results in attraction.

If the valve 22 is opened in this state, air is supplied from the main tank 19 into each air cylinder S1–S8 via the first and third air lines E1,E3. At the same time, air contained in each air cylinder S1–S8 is discharged into the reserve tank through the second and fourth air lines E2,E4 and the discharge line 26.

Therefore, the rods 6 of only the even-numbered air cylinders S2,S4,S6,S8 are simultaneously extended.

Figure 11A:
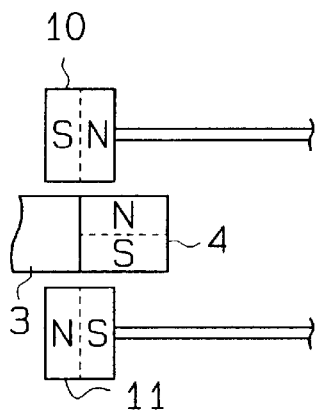
FIG. 11(a) is a schematic side view showing repulsion and attraction between the stationary permanent magnet and the moving permanent magnets.
Figure 11B:
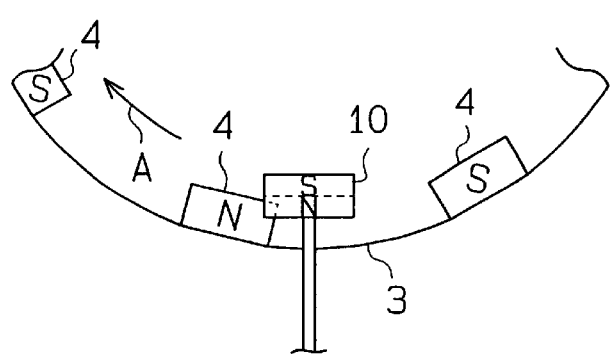
FIG. 11(b) is a schematic plan view of FIG. 11(a)

Therefore, as shown in FIGS. 11(a) and 11(b), the stationary permanent magnet 4 and the upper and lower moving permanent magnets 10,11 are placed in close proximity so that they repel each other. That is, the sides of the magnets 4,10,11 having like polarities are in close proximity to one another, which results in repulsion. As shown in FIG. 11(b), the rotating disk 3 is rotated by this repulsion in a direction of the arrow A. The next stationary permanent magnet 4, which has opposite polarity, comes close to the upper and lower moving permanent magnets 10,11 after the rotating disk 3 rotates a predetermined amount. The polarities of this stationary permanent magnet 4 and the upper and lower moving permanent magnets 10,11 are opposite to each other so that they are attracted each other so as to further rotate the rotating disk 3.

As the rotating disk 3 rotates, the actuating rods 14 of the first and third switching valves V1,V3 are moved away from the rollers 16 of the first and third valve driving mechanisms M1,M3, and the actuating rods 14 of the second and fourth switching valves V2,V4 engage the rollers 16 of the second and fourth valve driving mechanisms M2,M4. Air in the main tank 19 is then supplied to each air cylinder S1–S8 via the second and fourth air lines E2,E4. Also, air contained in each air cylinder S1–S8 is discharged via the first and third air lines E1,E3 and the discharge line 26. Therefore, all rods 6 of the even-numbered air cylinders S2,S4,S6,S8 retract simultaneously. At the same time, all rods 6 of the odd-numbered air cylinders S1,S3,S5,S7 are simultaneously extended.

Figure 12A:
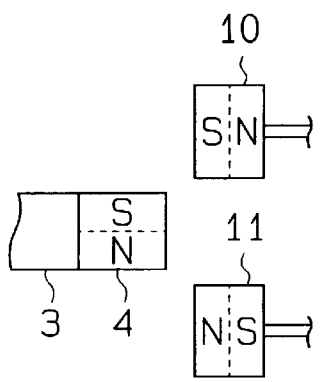
FIG. 12(a) is a schematic side view showing repulsion between the stationary permanent magnet and the moving permanent magnets.
Figure 12B:
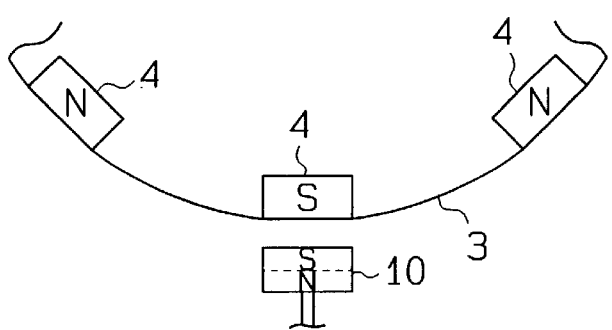
FIG. 12(b) is a schematic plan view of FIG. 12(a)

As shown in FIGS. 12(a) and 12(b), the stationary permanent magnet 4 and the upper and lower moving permanent magnets 10,11 are placed in close proximity so that they repel each other due to their magnetic force. That is the sides of the magnets 4,10,11 having like polarities are in close proximity, which results in repulsion. The rotating disk 3 is rotated by this repulsion in the direction of the arrow A of FIG. 11(b). By repeating the same procedure described above, the rotating disk 3 is rotated continuously. The torque of the rotating disk 3 is transmitted to the drive shaft 2 as a driving force.

The rods 6 of the odd-numbered air cylinders S1,S3,S5,S7 are retracted when the rods 6 of the even-numbered air cylinders S2,S4,S6,S8 are extended. Also, the rods 6 of the odd-numbered air cylinders S1,S3,S5,S7 are extended when the rods 6 of the even-numbered air cylinders S2,S4,S6,S8 are retracted. The rotating disk 3 is continuously rotated in the direction of the arrow A as shown in FIG. 11(b) as a result of the repeating attraction and repulsion of the stationary permanent magnet 4 and the upper and lower moving permanent magnets 10,11 produced in the same manner as described above in reference to the even-numbered air cylinders S2,S4,S6,S8.

The present invention has following advantages (1)–(7).

(1) The drive shaft 2 is rotated by rotating the rotating disk 3 which in turn is rotated by the attractive and repulsive forces created between the stationary permanent magnets 4 provided on the rotating disk 3 and the upper and lower permanent magnets 10,11. The attractive and repulsive forces are created by moving the upper and lower permanent magnets 10,11 forward and backward relative to the stationary permanent magnets 4 using the rods 6 of air cylinders S1–S8. As a result, unlike a reciprocating engine, noxious exhaust gas containing soot, nitrogen oxide and others will not be released into the atmosphere since gasoline fuel is not used. Therefore, deterioration of the environment due to the noxious exhaust gas is prevented.

(2) Gaps K between the stationary permanent magnets 4 and the upper and lower moving permanent magnets 10,11 differ between the leading and trailing sides of the stationary permanent magnets 4 since the stationary permanent magnets 4 are inclined relative to the top and bottom surfaces of the rotating disk 3. Therefore, the magnetic forces between the stationary permanent magnets 4 and the both upper and lower moving permanent magnets 10,11 are unbalanced when the upper and lower moving permanent magnets 10,11 are placed in close proximity of the stationary permanent magnets 4. As a result, the rotating disk 3 is smoothly and reliably rotated.

(3) In comparison to a driving apparatus comprising only one set of the upper and lower moving permanent magnets 10,11, the driving apparatus of the present invention can create stronger magnetic force and higher torque with use of a plurality of sets of the stationary permanent magnets 4 and the upper and lower moving permanent magnets 10,11.

(4) Attractive and repulsive forces are balanced throughout the rotating disk 3 since a plurality of the stationary permanent magnets 4 and the upper and lower moving permanent magnets 10,11 are provided on the same circumference at the equal intervals. As a result, the torque of the rotating disk 3 does not dramatically fluctuate, and the rotating disk 3 is rotated smoothly.

(5) Higher rotational speeds of the rotating disk 3 can be achieved in comparison to a motor driven apparatus comprised of gear and ring mechanisms and the like since the upper and lower moving permanent magnets 10,11 can be moved quickly by switching only the first to fourth switching valves V1–V4. This quick switch is accomplished by using the air cylinders S1–S8 to move the upper and lower moving permanent magnets 10,11. Assembly of parts of the driving apparatus in accordance with the present invention is relatively easy since mounting of only commercially available ready-made air cylinders S1–S8 are required so that the amount of the assembly work is reduced.

(6) Instead of using an electric powered compressor or the like, the manual air pump 21 is used for supplying air into the main tank 19 and the reserve tank 20 for actuating each air cylinder S1–S8. Therefore, running cost of each air cylinder S1–S8 is relatively low.

(7) The rotating disk 3 can be effectively rotated with a little magnetic force since the rotating disk 3 is made of non-magnetic, light weight aluminum.

The present invention can be modified as follows.

Figure 13:
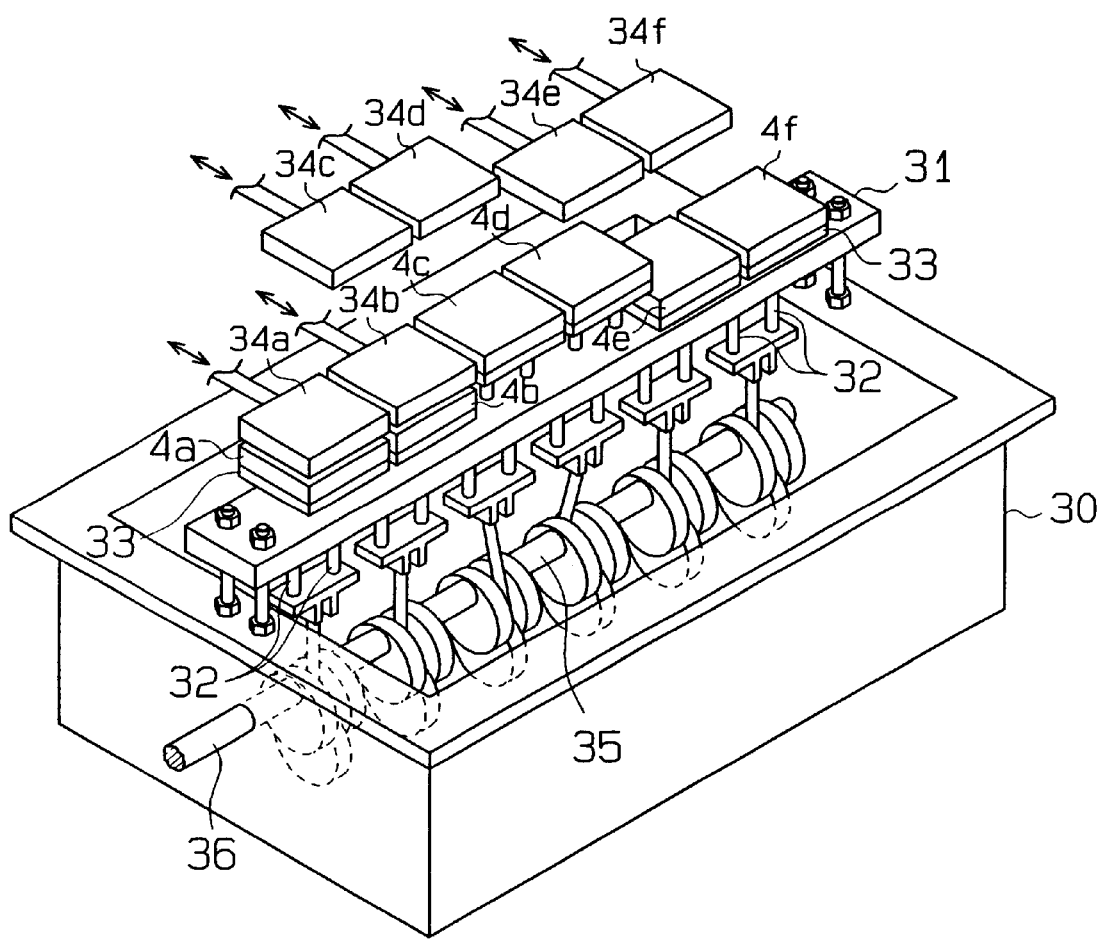
FIG. 13 is a perspective view of a driving apparatus according to another embodiment of the present invention.

(a) In the above embodiment, the rotating disk 3 is rotated by moving the upper and lower moving permanent magnets 10,11 forward and backward relative to the stationary permanent magnets 4. This embodiment can be modified to form an arrangement shown in FIG. 13. A plurality of rods 32 are slidably supported through a supporting plate 31 placed on a top of a frame 30. A lower end of each reciprocating rod 32 is coupled with a crankpin of a crankshaft 35. Mounting plate 33 is fixed on each upper end of the rod 32. Stationary permanent magnets 4a–4f moving in pairs are fixed on upper surfaces of the corresponding mounting plates 33. Permanent magnets 34a–34f are moved reciprocally forward and backward relative to corresponding stationary permanent magnets 4a–4f in pairs. By continuously moving pairs of the moving permanent magnets 34a, 34b;34c,34d;34e,34f toward and away from corresponding pairs of stationary permanent magnets 4a,4b;4c,4d;4e,4f at different timings, the moving permanent magnets 34a, 34b;34c,34d;34e,34f and the corresponding stationary permanent magnets 4a,4b;4c,4d;4e,4f are repeatedly attracted to and repelled from each other. As a result, each rod 32 moves upward and downward so as to rotate the crankshaft 34 continuously.

(b) The upper and lower moving permanent magnets 10,11 may be inclined relative to the stationary permanent magnet 4 instead of inclining the stationary permanent magnet 4 relative to the upper and lower moving permanent magnets 10,11.

(c) Also, in the embodiment of FIGS. 1, either the upper or the lower moving permanent magnet 10,11 can be eliminated. In so doing, only either the upper or lower moving permanent magnet 10,11 is moved forward and backward relative to the corresponding upper or lower surface of the stationary permanent magnet 4.

(d) Also, in the embodiment of FIG. 1, the air cylinders S1–S8 are used to move the upper and lower moving permanent magnets 10,11. Hydraulic cylinders can be utilized in place of the air cylinders S1–S8.

(e) In the embodiment of FIG. 1, the first to fourth valve driving mechanisms M1–M4 and the drive shaft 2 can also be made of aluminum. With this arrangement, the rotating disk 3 can be more effectively rotated. Also, the rotating disk 3 can be made of synthetic resin that is lighter than aluminum.

(f) In the embodiment of FIG. 1, the manual air pump 21 is used to supply air into the main tank 19. A compressor operated with power supplied from a solar battery can be used in place of the air pump 21.

(g) An air pressure intensifier can be used in place of the compressor or the air pump 21. With this arrangement, exhaust pressure of the reserve tank 20 can be utilized.

(h) Instead of utilizing a plurality of sets of the stationary permanent magnets 4 and the upper and lower moving permanent magnets 10,11 along a circumference of the rotating disk 3 as shown in the above embodiment, only one set of the stationary permanent magnets 4 and one set of the upper and lower moving permanent magnets 10,11 may be utilized.

(i) In the above embodiment of FIG. 1, only one rotating disk 3 is fixed on the drive shaft 2. However, the frame 1 may be elongated in the axial direction so as to provide a plurality of rotating disks 3 with stationary permanent magnets 4 along the drive shaft 2. As the number of rotating disks 3 is increased, the corresponding number of air cylinders S1–S8 having the rods 6 with the upper and lower moving permanent magnets 10,11 are further provided. With this arrangement, the rotational speed and torque of the drive shaft 2 can be increased since a plurality of the rotating disks 3 are used for rotating the drive shaft 2.

(j) In the embodiment of FIG. 1, an interval T1 between respective two stationary permanent magnets 4 is longer than the width T2 of the upper and lower permanent magnets 10, 11 (i.e., T1>T2). This length relationship can be switched in such a way that the interval T1 is shorter than the width T2 of the upper and lower permanent magnets 10,11 (i.e., T1<T2). With this arrangement, attraction and repulsion between the stationary permanent magnet 4 and the upper and lower moving permanent magnets 10,11 occur nearly simultaneously. Therefore, the rotating disk 3 can be more smoothly rotated.

What is claimed is:

1. A driving apparatus comprising:

a rotatable disk;

a plurality of first permanent magnets arranged along a periphery of the disk, each of said first permanent magnets having a pair of first magnet pieces that have polarities opposite to each other; and a reciprocal means having a magnet alley, said magnet alley formed by a plurality of second permanent magnets each of said second permanent magnets comprising a pair of second magnet pieces that are spaced from each other and define said magnet alley, wherein the reciprocal means extends and retracts in a radial direction with respect to the disk, thereby moving the second permanent magnets to a first position in which the pairs of second magnet pieces are respectively above and below associated ones of the first permanent magnets and the first permanent magnets are located in the magnet alley and a second position away from the disk and the first permanent magnets wherein:

one of each of said second magnet pieces includes a first magnet segment and a second magnet segment, said first and second magnet segments having polarities opposite to each other;

the other one of each of said second magnet pieces includes a third magnet segment and a fourth magnet segment, said third and fourth magnet segments having polarities opposite to each other; and said first magnet segment and said third magnet segment are arranged in parallel so that their polarities are opposite to each other, and said second magnet segment and said fourth magnet segment are arranged in parallel so that their polarities are opposite to each other.

2. A driving apparatus comprising:

a rotatable disk;

a plurality of first permanent magnets arranged along a periphery of the disk, each of said first permanent magnets having a pair of first magnet pieces that have polarities opposite to each other; and a reciprocal means having a magnet alley, said magnet alley formed by a plurality of second permanent magnets, each of said second permanent magnets comprising a pair of second magnet pieces that are spaced from each other and define said magnet alley, wherein the reciprocal means extends and retracts in a radial direction with respect to the disk, thereby moving the second permanent magnets to a first position in which the pairs of second magnet pieces are respectively above and below associated ones of the first permanent magnets and the first permanent magnets are located in the magnet alley and a second position away from the disk and the first permanent magnets wherein adjacent first permanent magnets have polarities opposite to each other, and wherein adjacent second permanent magnets have polarities opposite to each other, said first permanent magnet includes a first end and a second end, said second permanent magnet includes a distal end and a proximal end, wherein when said second permanent magnets are in said first position, said first end and said distal end are spaced by a first distance and said second end and said proximal end are spaced by a second distance different from the first distance.

3. The driving apparatus as set forth in claim 2, further comprising: a cylinder to actuate said reciprocal means.

4. A driving apparatus, comprising:

a rotatable disk having top and bottom surfaces; p1 a plurality of pairs of first permanent magnets, one magnet of each pair being attached to the top surface of the disk and the other magnet of each pair being attached to the bottom surface of the disk, the pairs of first permanent magnets being arranged at spaced intervals along the periphery of the disk, wherein one magnet in each pair of the first permanent magnets has one polarity and the other magnet in each pair has an opposite polarity;

a plurality of movement means located at spaced intervals around the periphery of the disk;

a plurality of pairs of second permanent magnets attached to corresponding ones of the movement means, wherein the movement means extend and retract in a radial direction with respect to the disk, thereby moving the pairs of second permanent magnets to a first position where one magnet of each pair of second magnets is above a corresponding one magnet of one of the pairs of first magnets and the other magnet of each pair of second magnets is below a corresponding one magnet of one of the pairs of first magnets, and a second position away from the disk and the pairs of first permanent magnets, wherein each first magnet has a cross-section that forms a parallelogram, and top and bottom surfaces thereof are slightly inclined relative to the top and bottom surfaces of the disk.

5. The driving apparatus of claim 4, wherein the disk is composed of a non-magnetic material.

6. The driving apparatus of claim 4, wherein when the second magnets are moved to a position opposing the first magnets, a distance between the surfaces of the opposing first and second magnets varies.

7. A driving apparatus, comprising:

a rotatable disk having top and bottom surfaces;

a plurality of pairs of first permanent magnets, one magnet of each pair being attached to the top surface of the disk and the other magnet of each pair being attached to the bottom surface of the disk, the pairs of first permanent magnets being arranged at spaced intervals along the periphery of the disk, wherein one magnet in each pair of the first permanent magnets has one polarity and the other magnet in each pair has an opposite polarity;

a plurality of movement means located at spaced intervals around the periphery of the disk;

a plurality of pairs of second permanent magnets attached to corresponding ones of the movement means, wherein the movement means extend and retract in a radial direction with respect to the disk, thereby moving the pairs of second permanent magnets to a first position where one magnet of each pair of second magnets is above a corresponding one magnet of one of the pairs of first magnets and the other magnet of each pair of second magnets is below a corresponding one magnet of one of the pairs of first magnets, and a second position away from the disk and the pairs of first permanent magnets, wherein the movement means include fluidic cylinder type movement means.

8. A driving apparatus, comprising:

a rotatable disk having top and bottom surfaces;

a plurality of pairs of first permanent magnets, one magnet of each pair being attached to the top surface of the disk and the other magnet of each pair being attached to the bottom surface of the disk, the pairs of first permanent magnets being arranged at spaced intervals along the periphery of the disk, wherein one magnet in each pair of the first permanent magnets has one polarity and the other magnet in each pair has an opposite polarity;

a plurality of movement means located at spaced intervals around the periphery of the disk;

a plurality of pairs of second permanent magnets attached to corresponding ones of the movement means, wherein the movement means extend and retract in a radial direction with respect to the disk, thereby moving the pairs of second permanent magnets to a first position where one magnet of each pair of second magnets is above a corresponding one magnet of one of the pairs of first magnets and the other magnet of each pair of second magnets is below a corresponding one magnet of one of the pairs of first magnets, and a second position away from the disk and the pairs of first permanent magnets, wherein a first magnet of each pair of second permanent magnets comprises a first magnet segment and a second magnet segment having opposite polarities, a second magnet of each pair of second permanent magnets comprises a third magnet segment and fourth magnet segment having opposite polarities, and wherein the first magnet segment and the third magnet segment are arranged in parallel such that their polarities are opposite to each other and the second magnet segment and the fourth magnet segment are arranged in parallel so that their polarities are opposite to each other.

9. A driving apparatus comprising:

a rotatable disk member having a first magnet alley, said first magnet alley including a plurality of first permanent magnets arranged along a periphery of the disk member, each first permanent magnet of said plurality of first permanent magnets having a pair of first magnet pieces that have polarities opposite to each other; and a reciprocal apparatus having a second magnet alley, said second magnet alley having a plurality of second permanent magnets, each second permanent magnet of said plurality of second permanent magnets including a pair of second magnet pieces, one second magnet piece of said pair of second magnet pieces including a first magnet segment and a second magnet segment, said first and second magnet segments having polarities opposite to each other, another second magnet piece of said pair of second magnet pieces including a third magnet segment and a fourth magnet segment, said third and fourth magnet segments having polarities opposite to each other;

said reciprocal apparatus being operable to position said second permanent magnets relative to said first permanent magnets whereby said second magnet pieces selectively attract and repel said first magnet pieces;

wherein said first magnet segment and said third magnet segment are arranged in parallel so that said first segment and said third segment are in opposite polarities; and wherein said second magnet segment and said fourth magnet segment are arranged in parallel so that said second magnet segment and said fourth magnet segment are in opposite polarities.

* * * * *